United States Patent Office 2,908,575
Patented Oct. 13, 1959

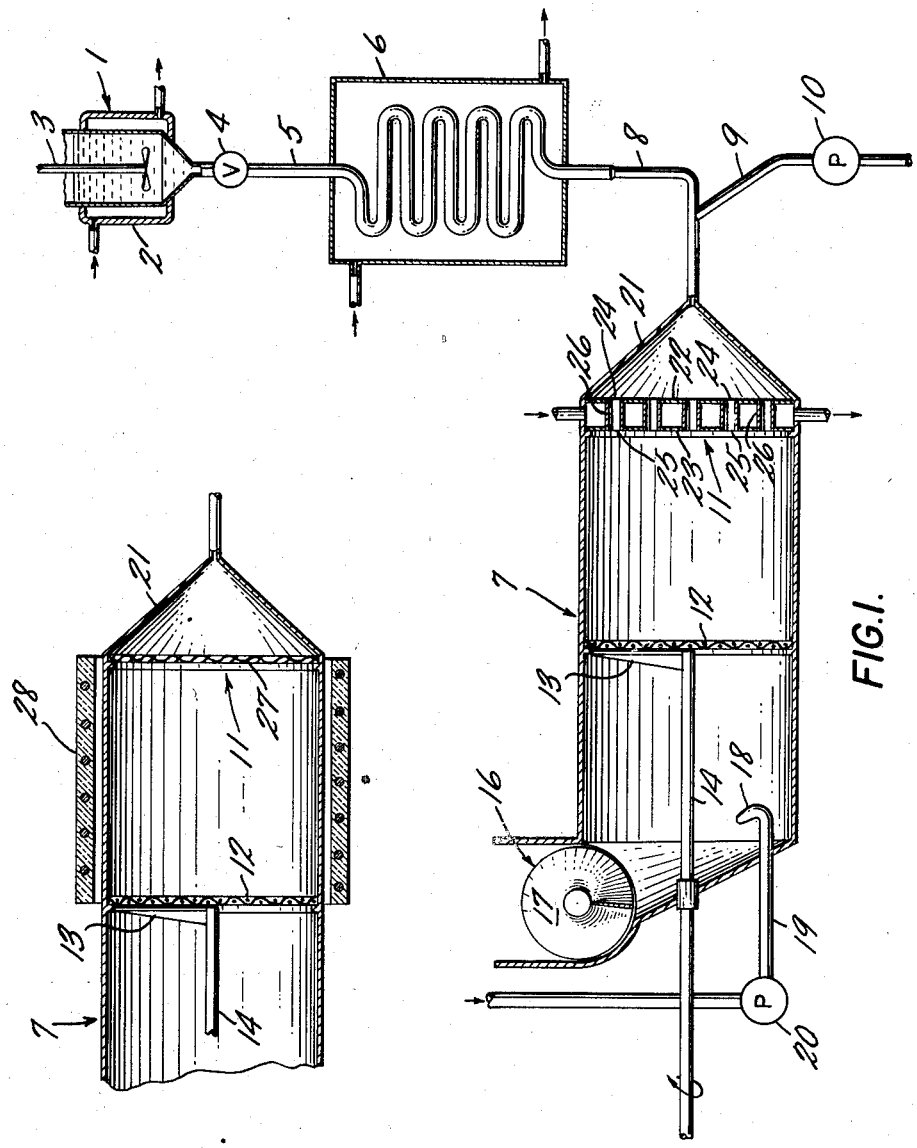

2,908,575

METHOD AND APPARATUS FOR THE CONTINUOUS PRODUCTION OF CHEESE CURD

Newton E. Spiess, Jr., Oakdale, and Robert A. Hollis, West Islip, N.Y., assignors, by mesne assignments, to National Dairy Products Corporation, New York, N.Y., a corporation of Delaware Application March 27, 1956, Serial No. 574,331

13 Claims. (Cl. 99—116)

The present invention relates to a method and apparatus for the production of cheese curd, and more particularly to a continuous flow process for the production of cheese curd and an apparatus for the same.

The production of many of the commonest types of cheese involves coagulation of milk or skim milk under carefully controlled conditions followed by cutting to form small cubes of curd. For example, in making cheddar cheese, rennet and a bacterial culture are added to whole milk and the mixture then allowed to stand at about 90° F. for about 30 minutes. At the end of this time the milk will have coagulated and the resulting curd is cut by hand to one inch cubes. These cubes are cooked in the whey which separates during the cutting operation and are finally drained and cheddared to form a solid mass that is pressed in cheese presses. In the case of cottage cheese, coagulation is the result of acid development resulting from bacterial action, but the curd is cut, cooked, and drained in much the same way as for cheddar cheese.

At the present time most cut and cooked curd is made by a batch process in large vats where it is cut into cubes by hand. Much of the manipulation of the curd during cooking and subsequent removal of the whey is also done by hand.

Attempts to mechanize this process and to make it continuous have been largely unsuccessful. For example, in United States Patent No. 2,657,993 there has been disclosed a process which involves moving a plurality of vessels by means of an endless conveyor past a series of spouts which successively feed into the vessels milk, a starter, and a coagulant to coagulate the milk in the form of curds and whey. The vessels containing the milk may then be heated and passed by a station having a vertically reciprocating cutter blade for subdividing the cheese curds. Such a process, however, actually involves the processing of a continuous series of batches of milk for the formation of cheese curds. Moreover, the process is too complex from a mechanical point of view.

A further attempt at devising a continuous process for the production of cheese curd is disclosed in United States Patent No. 2,505,984 and involves passing milk from tanks into vats to which are added rennet or other additives to form curds and whey and then allowing the milk to coagulate in the vats. In this process, however, the milk in the vats is actually in a stationary position during the entire fermentation and coagulation thereof. Consequently, such a process is not in reality a continuous flow process.

Accordingly, it is the object of the present invention to provide a continuous flow process for the production of cheese curd. Further objects are to provide a continuous flow process which may be automatically controlled, which reduces labor to a minimum, which may be conducted in simple and inexpensive apparatus, and which utilizes apparatus which may be readily cleaned.

Heretofore, it has not been possible to produce cheese curds by a continuous flow process, since milk must be quiescent while the curd is being formed. For this reason the flow of a stream of milk through a pipe or tank system as with conventional continuous processes will not yield a satisfactory product due to the agitation of the milk caused by the turbulence of the flowing stream. Milk must coagulate in the form of a gel in order to form a satisfactory cheese curd. Agitation, however, results in the formation of flocs of casein and causes the precipitation of finely divided casein rather than the formation of a satisfactory cheese curd.

The problem involved herein is, therefore, the passage of milk containing rennet or a bacterial culture through a coagulation tube to allow the milk to ferment and coagulate in the form of cheese curd without agitation. As noted above the flow of milk through a tube causes agitation of the milk and destroys its quiescent state, since the milk in the center of the tube flows at a faster rate than the milk along the inner walls thereof so that the velocity profile of a stream of milk in a tube resembles a parabola. This difficulty of the agitation of milk while flowing through a tube could be overcome if the velocity profile of the milk stream was flat, i.e., there is no shear between layers of milk except at the wall of the coagulation tube, since all particles of milk are moving at the same speed or with a relative velocity of zero.

The apparatus of the invention which makes the continuous flow process for the production of cheese curds possible utilizes a distributing means adjacent the ingress end of a coagulation tube. This distributing means makes possible the obtention of a flat velocity profile of the milk stream during coagulation to form cheese curd. After fermentation and coagulation of the milk the cheese curd is subdivided by suitable means hereinafter set forth.

The apparatus of the invention makes possible several modifications of a continuous flow process for the production of cheese curd. In the first modification, a stream of milk is fermented at a temperature of about 90° F. while passing through a coagulation tube at this temperature to permit coalescence resulting in the formation of cheese curd. During the fermentation and coagulation of the milk stream, the milk stream is maintained at a flat velocity profile. The cheese curd is then subdivided.

In the other modifications of the process, the time that the milk stream is within the coagulation tube is greatly reduced to further eliminate any possibility of agitation of the milk stream during fermentation and coagulation and to increase the throughput of the apparatus.

Accordingly, in the second modification of the continuous flow process for the production of cheese curd a stream of milk is partially fermented to an acidity of about pH 5.5 at a temperature of about 90° F. prior to passing the stream of milk at a temperature of about 90° F. through a coagulation tube wherein the milk in the stream is maintained at a flat velocity profile to permit further fermentation and coalescence resulting in the formation of cheese curd. The cheese curd is then subdivided.

In the third modification of the process a stream of milk is cooled to a temperature within the range of about 32° F. to about 40° F. and acid then added thereto to adjust the pH of the milk within the range from about 4.4 to about 4.8. The stream of milk is then passed through a coagulation tube at a temperature of about 90° F. while maintaining the milk in the stream at a flat velocity profile to permit further fermentation and coalescence resulting in the formation of cheese curd which is subsequently subdivided.

The fourth modification of the process is a variation of the third modification and involves the preparation of enzyme coagulated cheeses rather than acid-type chesses.

In this modification a stream of milk is cooled to a temperature within the range from about 32° F. to about 40° F. and an enzyme added thereto. The stream of milk is then heated to a temperature of about 90° F. prior to entry into a coagulation tube. The stream of milk is then passed through the coagulation tube while maintaining the milk in the stream at a flat velocity profile to permit further fermentation and coalescence resulting in the formation of cheese curds which are subsequently subdivided.

In the fifth modification of the process a stream of milk is partially fermented to an acidity of about pH 5.5 at a temperature of about 90° F. The stream of milk is then cooled to a temperature within the range of about 32° F. to about 40° F. and acid added thereto to adjust the pH of the milk within the range from about 4.4 to about 4.8. The stream of milk is then passed through a coagulation tube at a temperature of about 90° F. while maintaining the milk in the stream at a flat velocity profile to permit further fermentation and coalescence resulting in the formation of cheese curd. The cheese curd is then subdivided.

The invention will be further described in connection with the accompanying drawing wherein, Figure 1 is a vertical sectional view of a suitable apparatus for use in the process, and Figure 2 is a vertical sectional view of part of a modified coagulation tube.

Referring now to Figure 1 of the drawing, a tank 1 is provided with a jacket 2 through which is passed any suitable heating fluid, such as steam, and contains an agitator 3. The rate of flow of material from tank 1 is controlled by a valve 4 in line 5 connected to the base of the tank. Line 5 is connected to a heat exchanger 6 through which is passed a suitable cooling medium. The heat exchanger 6 is connected by means of small diameter line 8 to a conical member 21 mounted on the ingress end of coagulation tube 7. Joining line 8 prior to connection therewith with coagulation tube 7 is a line 9 provided with a pump 10 therein. At the ingress end of coagulation tube 7 and at the base of the conical member 21 is a radially disposed distributor 11. The distributor 11 is formed of parallel plates 22 and 23 having a plurality of small holes 24 and 25 respectively therein. Opposed holes are connected by small diameter tubes 26 around which is circulated a heating medium, such as warm water. Approximately midway along the length of the coagulation tube is a radially mounted die or wire screen 12. A radially disposed blade or blades 13 attached to a rotary axial shaft 14 lies flush against the wire screen 12 at the face thereof remote from the ingress end of the coagulation tube 7. At the upper wall of the egress end of coagulation tube 7 there is a screw conveyor 16 provided with a screw 17. At the lower wall of the egress end of coagulation tube 7 there is an ejector nozzle 18 connected to line 19 which is provided with a pump 20.

The mode of operation of this apparatus when used with any of the five modifications of the process is set forth below.

In the first modification of the process tank 1 and heat exchanger 6 are dispensed with as well as valve 4, lines 5 and 9 and pump 10. A stream of milk containing a conventional bacterial culture, such as a Danish buttermilk culture (FDL), is fed through line 8 to coagulation tube 7. Distributor 11 in coagulation tube 7 admits thereto a uniform amount of milk per unit of cross sectional area via tubes 26. Since the same amount of milk is being introduced over the entire cross sectional area of the coagulation tube, the milk in the stream is maintained at a flat velocity profile, i.e., near the distributor at least the milk will be in shear only at the walls of the coagulation tube and conditions suitable for setting of curd will have been established over most of the cross-sectional area of the coagulation tube. The milk in passing through tubes 26 is heated to about 90° F. by the warm water circulating about the tubes. The milk containing the bacterial culture undergoes fermentation and coagulation resulting in the formation of cheese curds under the influence of the bacterial culture and heat after passing through tubes 26 and into coagulation tube 7. The pressure of the milk stream passing through the coagulation tube forces the cheese curds through wire screen 12 thereby cutting the cheese curds into ribbons which are subdivided into cuboids by the rotation of blade 13 mounted upon rotary shaft 14, which is connected to a motive force not shown. The wire screen and the plug of curds retard the flow of the milk stream and thereby assist in maintaining a flat velocity profile. The curds and whey passing through the wire screen 12 are ejected from the coagulation tube 7 by means of ejector nozzle 18 which is connected by line 19 to a source of whey which has been subsequently separated from the cheese curds. The upward force of the stream of whey through nozzle 18 forces the curds and whey upwardly to screw conveyor 16 wherein the curds are cooked, followed by separation of the curds from the whey upon stainless steel mesh conveyor belts not shown.

As noted above, the capacity of the coagulation tube 7 and the throughput thereof may be increased by having some of the fermentation of the milk in the milk stream take place outside of the coagulation tube or by increasing the rate of fermentation within the coagulation tube.

Thus, in the second modification of the process heat exchanger 6 and line 9 with pump 10 therein are dispensed with. In this second modification of the process milk is added to tank 1 containing a conventional bacterial culture. The milk flowing through tank 1 is heated by heating jacket 2 to a temperature of about 90° F. and mildly agitated by agitator 3. The milk in the milk stream passing through tank 1 undergoes partial fermentation while passing therethrough. The rate of flow through the tank is regulated by valve 4 mounted in line 5 connected to the base of the tank so that the milk flowing out of tank 1 is partially fermented to an acidity of about pH 5.5. The stream of milk then flows through lines 5 and 8 into coagulation tube 7. Upon entering coagulation tube 7 the stream of milk passes through heated tubes 26 of distributor 11 which maintains the milk at 90° F. and insures that the stream of milk passing through the coagulation tube will have a flat velocity profile. The milk stream which has passed through distributor 11 continues to ferment in coagulation tube 7 at a temperature of about 90° F. and undergoes coagulation resulting in the formation of cheese curd. The resulting cheese curd is then subdivided and removed from coagulation tube 7 as set forth above.

In the third modification of the process the tank 1 is dispensed with as well as valve 4. In this modification a stream of milk is fed into line 5 and through heat exchanger 6 where the stream of milk is cooled within the range from about 32° F. to about 40° F. The cooled stream of milk is fed from heat exchanger 6 through line 8 to coagulation tube 7. Prior to entry of the milk stream into coagulation tube 7, an acid, such as lactic, hydrochloric, phosphoric, or sulfuric acid, is added to the milk stream by means of line 9 and pump 10 to adjust the pH of the milk within the range from about 4.4 to about 4.8. The acidified milk stream is then passed through heated tubes 26 of distributor 11 to increase the temperature to about 90° F. and to impart thereto a flat velocity profile. After passing through distributor 11 the milk stream undergoes further fermentation and coalescence resulting in the formation of cheese curd. The cheese curd is subdivided by means of wire screen 12 and rotary blade 13 and ejected from the coagulation tube 7 as hereinabove set forth.

In the fourth modification of the process tank 1 is also dispensed with as well as valve 4. In this modification of the process a stream of milk is fed through pipe 5 into heat exchanger 6 where the stream of milk is cooled to a temperature within the range from about 32° F. to about 40° F. The cooled stream of milk flows from heat exchanger 6 through line 8 and past line 9 where a conventional enzyme, such as rennet, is added thereto via line 9 and pump 10. The stream of milk containing the enzyme then passes through heated tubes 26 of distributor 11 to raise the temperature of the stream of milk to about 90° F. and to impart a flat velocity profile to the stream of milk in coagulation tube 7. In coagulation tube 7 the stream of milk undergoes fermentation and coalescence resulting in the formation of cheese curd which is subdivided and removed from coagulation tube 7 as hereinabove set forth.

In the fifth modification of the process all parts of the apparatus shown in the drawing are employed. In this modification a stream of milk is passed through tank 1 containing a conventional bacterial culture and is mildly agitated by agitator 3 while being heated to a temperature of about 90° F. by means of heating jacket 2. The flow of milk through tank 1 is so regulated by valve 4 that the partially fermented milk leaving tank 1 has an acidity of about pH 5.5. The stream of milk then passes through line 5 and into heat exchanger 6 where it is cooled to a temperature within the range from about 32° F. to about 40° F. The milk stream then leaves heat exchanger 6 via line 8 and an acid, such as lactic acid, sulfuric acid, phosphoric acid, or hydrochloric acid, is added thereto via line 9 to adjust the pH of the milk within the range from about 4.4 to about 4.8. The acidified stream of milk then enters coagulation tube 7 by passing through heated tubes 26 of distributor 11 which heat the milk stream to a temperature of about 90° F. and impart thereto a flat velocity profile. As before, the cheese curd is forced through wire screen 12 in the form of ribbons which are subdivided by rotary blade 13 into cuboids. The subdivided cheese curds are then ejected from coagulation tube 7 by means of ejector nozzle 18 and conveyor 16.

In starting up the apparatus it is necessary to fill the coagulation tube 7 with water the density of which has been adjusted by the addition of salt or sugar so that it will have the same density as milk. At the end of a run, the milk remaining in the coagulation tube 7 may be displaced by following it with water.

It was found that the air temperature surrounding a vertical coagulation tube 7 should be from about 0.2° F. to about 1.5° F. higher than the temperature of the milk in such a coagulation tube. This condition results in very slight heat transfer to the milk and reduces the density of the layer of milk against the walls of a vertical coagulation tube and thereby helps in maintaining a flat velocity profile.

It will be appreciated that the apparatus may take many forms. For example, the coagulation tube 7 may be mounted in a vertical position rather than in a horizontal position. In such an apparatus the ejector nozzle 18 is dispensed with and the cheese curd cutting means may be located at the egress end of the coagulation tube. Such a modified form of the apparatus may be started up without the use of liquid in the coagulation tube, since the air-liquid interface will maintain a flat velocity profile during the start-up period while the system is being filled with milk.

As a further modification of the apparatus the coagulation tube 7 may be provided with an outlet in the lower wall of the egress end of the tube for the removal of the curds and whey by gravity flow. With such an arrangement ejector nozzle 18 may be dispensed with and conveyor 16 placed at the lower wall of the egress end of the coagulation tube.

In another modification of the apparatus as shown in Figure 2 the distributing means 11 may take the form of a filter paper or filter cloth 27 radially disposed at the ingress end of coagulation tube 7. The ingress end of the coagulation tube as well as the distributing means may be conveniently heated by induction or resistance heating device 28 enclosing the section of the coagulation tube between the distributing means and the wire screen 12.

Since other modifications and variations in the process and apparatus of the invention will be readily apparent to those skilled in the art, the invention is to be limited only within the scope of the appended claims.

We claim:

1. A continuous flow process for the production of cheese curd which comprises passing a stream of milk through a radially disposed distributor in a coagulation tube to maintain the stream at a flat velocity profile in the tube during the fermentation and coagulation thereof at a temperature of about 90° F., and subdividing the resulting cheese curd.

2. A continuous flow process for the production of cheese curd which comprises partially fermenting a stream of milk to an acidity of about pH 5.5 at a temperature of about 90° F., passing the stream of milk through a radially disposed distributor in a coagulation tube to maintain the stream at a flat velocity profile in the tube during the further fermentation and coagulation thereof at a temperature of about 90° F., and subdividing the resulting cheese curd.

3. A continuous flow process for the production of cheese curd which comprises cooling a stream of milk to a temperature within the range from about 32° F. to about 40° F., adding acid to the stream of milk to adjust the pH of the milk within the range from about 4.4 to about 4.8, passing the stream of milk through a radially disposed distributor in a coagulation tube to maintain the stream at a flat velocity profile in the tube during the further fermentation and coagulation thereof at a temperature of about 90° F., and subdividing the resulting cheese curd.

4. A continuous flow process for the production of cheese curd which comprises cooling a stream of milk to a temperature within the range from about 32° F. to about 40° F. adding an enzyme to the stream of milk, heating the stream of milk to a temperature of about 90° F., passing the stream of milk through a radially disposed distributor in a coagulation tube to maintain the stream at a flat velocity profile in the tube during the further fermentation and coagulation thereof, and subdividing the resulting cheese curd.

5. A continuous flow process for the production of cheese curd which comprises partially fermenting a stream of milk to an acidity of about pH 5.5 at a temperature of about 90° F., cooling the stream of milk to a temperature within the range from about 32° F. to about 40° F., adding acid to the stream of milk to adjust the pH of the milk within the range from about 4.4 to about 4.8, passing the stream of milk through a radially disposed distributor in a coagulation tube to maintain the stream at a flat velocity profile in the tube during the further fermentation and coagulation thereof at a temperature of about 90° F., and subdividing the resulting cheese curd.

6. An apparatus for the continuous production of cheese curd from a stream of milk comprising a coagulation tube having a radially disposed distributing means at the ingress end thereof, a radially disposed die in the tube remote from the egress side of the distributing means, and a cutting means lying flush against the die at the face thereof remote from the ingress end of the tube.

7. An apparatus as set forth in claim 6 wherein the coagulation tube has an ejector adjacent the egress end of the tube and a conveyor connected at the egress end of the tube.

8. An apparatus as set forth in claim 6 wherein the coagulation tube is connected to means for the partial fermentation of the stream of milk.

9. An apparatus as set forth in claim 6 wherein the coagulation tube is connected to a heat exchanger, and means for adding material to the milk stream is connected between the coagulation tube and the heat exchanger.

10. An apparatus as set forth in claim 6 wherein the coagulation tube is connected to a heat exchanger, said heat exchanger being connected to means for the partial fermentation of milk.

11. An apparatus as set forth in claim 6 wherein said die is a wire screen.

12. An apparatus as set forth in claim 6 wherein said distributing means comprises two parallel plates having a plurality of holes therein, the opposed holes being connected by tubes.

13. An apparatus as set forth in claim 6 wherein said distributing means comprises a radially disposed filter sheet at the ingress end of the coagulation tube and a heating device enclosing the coagulation tube in the section thereof between the filter sheet and the die.

References Cited in the file of this patent

UNITED STATES PATENTS

| | | |
|---|---|---|
| 1,159,808 | Spencer et al. | Nov. 9, 1915 |
| 2,016,612 | Nilsson | Oct. 8, 1935 |
| 2,272,954 | Sartori | Feb. 10, 1942 |
| 2,574,508 | Strezynski | Nov. 13, 1951 |
| 2,781,269 | Harper et al. | Feb. 12, 1957 |